United States Patent Office 3,334,022
Patented Aug. 1, 1967

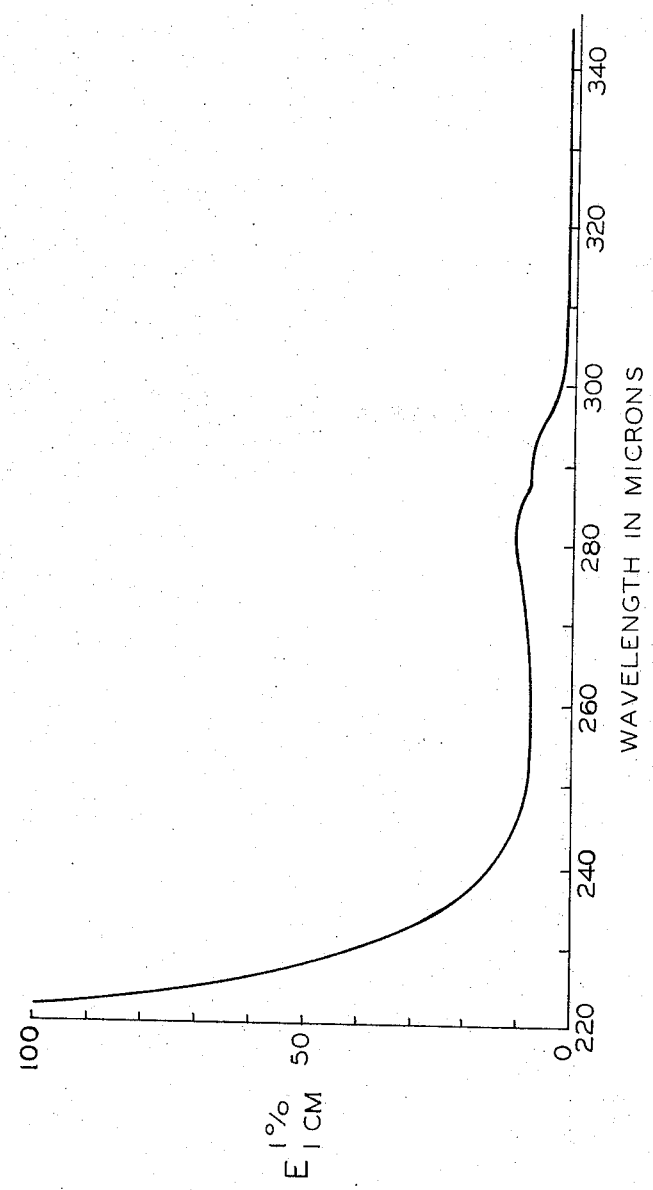

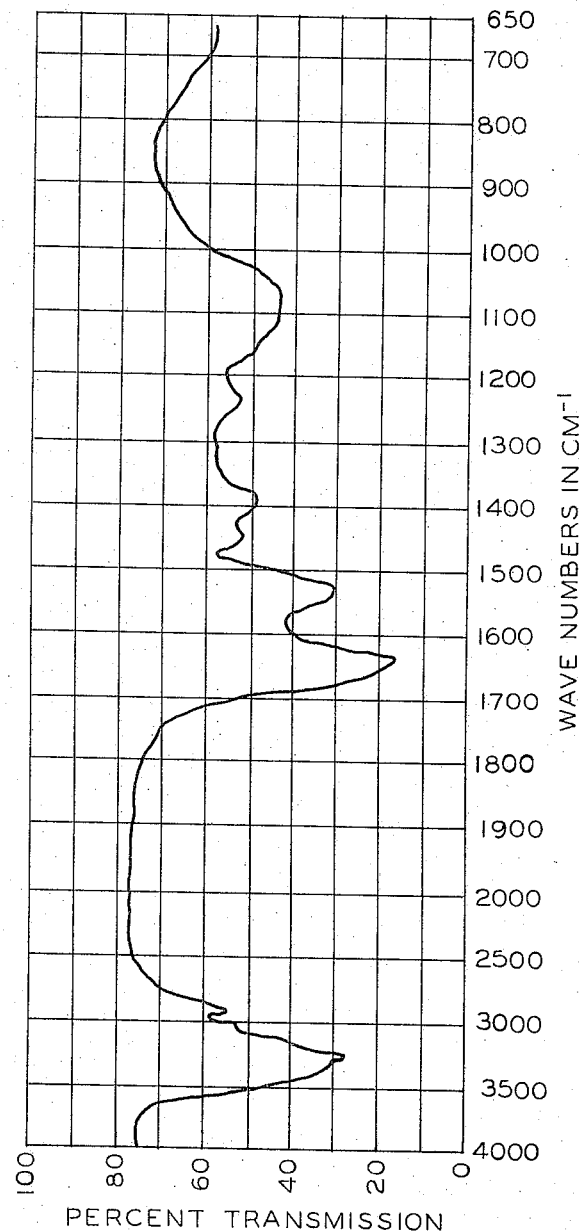

3,334,022
NEOCARZINOSTATIN PRODUCED BY
STREPTOMYCES CARZINOSTATICUS
VAR. NEOCARZINOSTATICUS
Nakao Ishida, 90 Kakogoro-cho; Keizo Miyazaki, 48 Kakyoin-dori; Katsuo Kumagai, 129 Tori-cho; and Mitsuo Rikimaru, 61 Kita-shichiban-cho, all of Sendai, Japan; and Masahiko Kuroya, c/o Room 605, Empire Corp., 28 Daikyo-machi, Shinjuku-ku, Tokyo, Japan
Filed Apr. 26, 1965, Ser. No. 450,599
10 Claims. (Cl. 195—80)

This invention relates to a new and useful antibiotic substance called neocarzinostatin and to its production. More particularly, it relates to processes for its production by fermentation and methods for its recovery and purification. This invention embraces this antimicrobial agent in dilute solutions, as crude concentrates, as crude solids, as purified solids and in pure crystalline forms. Neocarzinostatin inhibits the growth of Sarcoma 180 and leukemia SN–36 and 1210 tumors in mice. The substance also has activity against some bacteria, e.g. *Staphylococcus aureus* 209P, *Staphylococcus aureus* Kishima, *Staphylococcus aureus* Smith, *Staphylococcus aureus* 537, *Sarcina lutea*, *Bacillus subtilis* and *Escherichia coli*, making it useful in separating and classifying mixtures of microorganisms for biological research and for the removal of microorganisms from laboratory equipment and medical and dental instruments.

Carzinostatin, a high molecular weight substance having some antitumor activity, is produced by the fermentation of *Streptomyces carzinostaticus* and has been described in Japanese Patent No. 5400/1960. However, carzinostatin has only been recovered in crude form and is extremely unstable, and is particularly unstable to heat. When one attempts to recover carzinostatin in pure form, the product disintegrates into two parts, A and B, which have been found to be essentially inactive against tumors. Thus, it has not been possible to recover carzinostatin as a single compound. This problem is discussed by Jyun-ichi Shōji, at page 27, vol. 14A, The Journal of Antibiotics.

The present inventors have now discovered that the fermentation of certain variant strains of *Streptomyces carzinostaticus* obtained by ultraviolet radiation and the single-spore isolation method produce a relatively stable substance which can be recovered in pure form. They have designated this substance neocarzinostatin. The novel substance possesses antibacterial and antitumor activity and withstands heating and other processing requirements necessary for its recovery as a pure compound.

Thus, there is provided according to the present invention the process for the production of an antibiotic designated neocarzinostatin which comprises cultivating a neocarzinostatin-producing variant strain of *Streptomyces carzinostaticus* designated *Streptomyces carzinostaticus* var. *neocarzinostaticus* in an aqueous carbohydrate solution containing a nitrogenous nutrient under submerged aerobic conditions until substantial activity against *Sarcina lutea* is imparted to said solution, and then, if desired, recovering said neocarzinostatin from said solution. There is further included within the scope of the present invention the neocarzinostatin so produced.

In reference to the drawings, FIG. 1 is the ultraviolet absorption spectrum of neocarzinostatin. FIG. 2 is the infrared absorption spectrum of neocarzinostatin pelleted in potassium bromide.

Neocarzinostatin is a large molecular-weight substance with a molecular weight of approximately 6000. Although several large molecular weight anticancer substances are known, e.g. melanomycin, peptimycin, actinogan, malinamycin, enolmycin, etc., neocarzinostatin as produced by the process of this invention is clearly different from any of them in the area of molecular weight, antibiotic effects, and the like. Furthermore, its broad range of antitumor properties and its remarkably high chemotherapeutic properties are characteristics unknown to any of the conventional anticancer substances.

The microorganism producing the antibiotic neocarzinostatin of the present invention was isolated from carzinostatin-forming stocks using ultraviolet radiation and single-spore isolation methods, and is a variant of the species *Streptomyces carzinostaticus* which has been designated *Streptomyces carzinostaticus* var. *neocarzinostaticus*. Strains of *Streptomyces carzinostaticus* var. *neocarzinostaticus* have been given the laboratory designations F–41, F–42 (C–9544–JP8), and E–793 F–51 (C–9544–JP9). Strain F–42 (C–9544–JP8) and E–793 F–51 (C–9544–JP9), the most active neocarzinostatin-producing strains, have been deposited in the American Type Culture Collection, Rockville, Md., and added to its permanent collection of microorganisms as A.T.C.C. No. 15945 and A.T.C.C. No. 15944, respectively.

The present inventors hereinafter will describe the properties of the novel neocarzinostatin-producing variant of *Streptomyces carzinostaticus*, the methods for the separation of the substance designated as neocarzinostatin, and the chemical and biological characteristics of the novel substance.

The bacteriological properties of *Streptomyces carzinostaticus* var. *neocarzinostaticus* are as follows:

(1) Morphology:

(a) *Conidial Morphology.*—The sporosphere of conidium divides in zigzag fashion from one point of the aerial hyphae; its length is generally short; it forms closed or open spirals beyond the whorl; and, it grows no verticillate whorls.

(b) *Conidium.*—When observed under the electron microscope, the surface structure of the spores is characteristically of the process-type, more particularly projections are more like hairs than spines. The shape of the spore as a whole is ovoid; its size is about 1.5 x 2.0µ.

(2) Properties revealed in various agar media:

| Medium | Growth | Aerobic Hypha | Soluble Pigment |
|---|---|---|---|
| Tsuabec (glycerin) Agar Medium | Transparent | Light brownish grey | None. |
| Asparagine Agar Medium | do | Brownish grey | Do. |
| Potassium Malate Agar Medium | Transparent, dissolves potassium malate. | Light brownish grey | Do. |
| Nitrate-added Peptone Water | Transparent, capable of reducing nitrate salt. | None | Do. |
| Starch Agar Medium | Transparent, dissolves starch | Brownish grey | Do. |
| Tyrosine Agar Medium | Transparent | None | Do. |
| Potato Slice | Cream color | Light brownish grey | Yellowish brown. |
| Carrot Slice | do | From white to tea color | None. |
| Egg Agar Medium | Transparent | White | Do. |
| Blood Agar Medium | Olive color and hemolytic | From white to yellowish grey | Do. |
| Refrel Coagulated Blood Medium | Transparent wrinkled, does not dissolve medium. | White | Do. |
| Gelatin Medium | Transparent, no liquefaction of medium | do | Do. |
| Milk Medium | Verticillate yellow brown, milk solidifies, peptonized by growth. | do | Do. |
| Ordinary Agar Medium | Transparent, wrinkled | From white to yellowish grey | Do. |
| Cellulose | No growth | | |

NOTE.—Color standards based on *The Standards of Color* of the Color Research Institute of Japan, 1964 issue.

(3) Biochemical properties:
 (a) Nitrite formation: Occurs.
 (b) Melanoid formation: None.
 (c) Sugar utilization.

When examined in the agar media of Pridham and Gottlieb as the basic media, this strain readily utilizes and decomposes dextrin, maltose, saccharose, lactose, mannose, galactose, glucose, fructose, xylose, arabinose, rhamnose, glycerin, mannitol and inositol, but weakly utilizes insulin, dulcitol and sorbitol. The growth in raffinose is somewhat unsatisfactory but the organism seemed to utilize it.

The above-mentioned properties distinguish this variant of Streptomyces carzinostaticus from species described in Bergey's Manual of Determinative Bacteriology, 1957 issue. Among those species which can be remotely compared with Streptomyces carzinostaticus var. neocarzinostaticus, Streptomyces albus and Streptomyces griseolus may be mentioned. These and Streptomyces pseudogriseolus, which was designated by OKAMI in 1955 as a pseudo-Xanthomycin producing species, (J. of Antibiotics, A, p. 126, vol. 8, 1955) can be included as the most closely related species.

However, Streptomyces pseudo-griseolus forms a soluble brown pigment in a gelatin medium and dissolves the gelatin at a slow to fairly quick rate; these features can be said to be radically different from the present variant since it does not dissolve gelatin and produces no soluble pigment. Moreover, the substance produced by Streptomyces pseudo-griseolus is pseudo-Xanthomycin and is not a large molecular weight anticancer agent.

Neocarzinostatin is produced by the cultivation of a strain of Streptomyces carzinostaticus var. neocarzinostaticus under suitable conditions. The general procedures used for the cultivation of other Actinomycetes are applicable to the cultivation of Streptomyces carzinostaticus var. neocarzinostaticus. Neocarzinostatin is preferably produced by inoculating the neocarzinostatin-producing organism into a suitable medium and then cultivating under aerobic conditions. Although various materials can be used in the culturre medium as nutritive sources, the medium preferably contains as the source of nitrogen, an organic material such as peptone, meat extract, yeast extract, corn steep liquor, soybean meal, peanut meal, hydrolyzed protein substance, cottonseed meal, fish meal, distiller's solubles and when desired, inorganic sources of nitrogen such as nitrates and ammonium salts, e.g., ammonium sulfate; as the source of carbon, dextrose, lactose, maltose, glycerin, molasses, sucrose, starch, and other inorganic salts such as sodium chloride, potassium chloride and magnesium sulfate, and buffering agents such as calcium carbonate or phosphate and trace amounts of heavy metal salts; such medium ingredients include those listed in Canadian Patent No. 513,324 and in British Patents Nos. 730,341 and 736,325 and in United States Patents Nos. 2,691,618, 2,658,018, 2,653,899, 2,586,762, 2,516,080, 2,483,892, 2,609,329 and 2,709,672. In aerated submerged culture, an antifoam such as liquid paraffin, fatty oils or silicone is used. More than one kind of carbon source, nitrogen source or antifoam may be used for the production of neocarzinostatin.

For large scale culture with the previously mentioned nutritive sources, submerged aerobic culture is especially advantageous. Culture temperatures are usually 25–30° C., the most preferred range of temperature being 27–28° C. The pH of the culture medium ranges from 6–9, the optimum being about 7.

When neocarzinostatin-producing strains were cultured with agitation for 2–5 days at 28° C. in various sterile pH 7.2 media containing meat extract, peptone, sodium chloride and calcium carbonate, but containing different carbon sources, e.g. glycerin, dextrose, sucrose, maltose, starch and the like, the medium that contained dextrose as the carbon source was found to be the most stable and showed the highest rate of production of neocarzinostatin. The addition of yeast to the medium was found to be useful for increasing productivity. Also, it was found that a culture medium containing starch, sodium chloride, other inorganic salts, yeast extract and soybean powder produced excellent growth of the organism.

When the fermentation was carried out at 28° C. with agitation using the optimum culture medium at pH 7.2, i.e., dextrose 3%, meat extract 0.5%, petone 0.5%, sodium chloride 0.5%, calcium carbonate 0.2%, the pH of the medium dropped to 6.6–6.0 in 24 hours and thereafter rose to 6.8–7.2 in 48–72 hours. The culture filtrate obtained inhibited the growth of Sarcina lutea at a dilution of 1 to 120 and when added to normal cells, an effect on cell degeneration was indicated at a 1 to 1200 dilution.

To recover neocarzinostatin, the culture medium is separated by conventional filtration, centrifugation or other methods into a liquid portion and a solid portion, which contains the mycelium. Neocarzinostatin being water-soluble is largely contained in the liquid portion.

After separating the mycelium, it is found difficult to extract neocarzinostatin from the liquid portion at any pH with organic solvents that are not mixed with water, e.g. ethyl acetate, butyl acetate, butanol and the like, and in some instances, the neocarzinostatin in the liquid is destroyed. Although neocarzinostatin is adsorbed on activated charcoal, elution is usually difficult. However, it is possible to adsorb neocarzinostatin on weak adsorptive agents, e.g. acid clay kaolin, phlorizyl, magnesol, etc., acidified at pH 2; and effused into neutral water. It is also possible to adsorb and eliminate foreign matter by proper adjustment of the pH of the solution, e.g., at pH 7 without neocarzinostatin being adsorbed. This is an advantageous refining method with a great deal of utility.

It is difficult to refine neocarzinostatin in the culture medium by commonly used ion exchange resins. Neocarzinostatin in a medium or a weakly alkaline aqueous solution is relatively unstable. Because of this fact, when it is acidified and exposed to an anion exchange resin, such as Amberlite IRA-400, IR-4B or IRC-50, it does not adsorb on the resin, but it does adsorb on some strong cation exchange resins, e.g., Amberlite IR-120. However, it is difficult to effuse neocarzinostatin from the resin with ammonia, water or a combination of water and organic solvents. In this connection, although Dowex -50 Na type and H-type ion exchange resins are capable of adsorbing neocarzinostatin partially, when the above-mentioned effusion methods were attempted, only inactive ingredients were effused. Hence, neocarzinostatin was found to be unstable when these refining processes were used.

Among the separation methods for neocarzinostatin, one of the most effective ones is to salt out neocarzinostatin from aqueous solution, more particularly from a concentrated solution, by adding ammonium sulfate, sodium sulfate, etc., or by adding zinc chloride, or precipitating at the proper pH by the addition of methanol, ethanol, acetone, etc.

The most effective method of refining is that in which neocarzinostatin is precipitated by specially adding a proper amount of a saturated aqueous solution or powder of ammonium sulfate dissolved in mildly acidic water, and then dialyze by using semi-permeable film such as cellophane, to remove the ammonium sulfate and low molecular weight foreign matter. For the same effect, gel filtering agents may be used, e.g. Sephadex G-25, G-50 and G-75, the neocarzinostatin is isolated from the fractions. These are commercially available cross-linked dextran polymers which form gels with water and act as molecular sieves, and to absorb polyglucose molecules below 3000, 7000, and 10,000 molecular weight, respectively. They are marketed by Pharmacia Uppsala, Sweden. Still another useful final refining process is the use of a DEAE-Sephadex column (Diethylaminoethyl-Sephadex).

The neocarzinostatin obtained by a combination of the various above-mentioned methods, and described in the examples below, has the following properties:

(1) Neocarzinostatin is an acidic white powder, and the elemental analysis of its free acid shows: C, 41.34%; H, 9.43%; N, 11.13%.

(1) Neocarzinostatin is an acidic white powder, and the elemental analysis of its free acid shows: C. 41.34%; H, 9.43%; N, 11.13%.

(2) The melting point of neocarzinostatin is 260° C.

(3) The ultraviolet absorption spectrum of neocarzinostatin in an aqueous solution, as presented in FIG. 1, shows weak absorption at 278–280 mμ with a peak at 290 mμ.

(4) Its infrared absorption spectrum is as presented in FIG. 2.

(5) When the sedimentation constant of an aqueous solution of neocarzinostatin at a concentration of 10 mcg./ml. was measured, it was $$S\frac{w}{20} = 1.3$$

indicating a molecular weight of 7000, if it is assumed to be a spherical particle. A Spinco Model E centrifuge was used at 52,640 r.p.m.

(6) Moreover, when the dispersion constant of an aqueous solution of neocarzinostatin at a concentration of 7.5 mcg./ml. was measured by a Neurath apparatus at 20° C., it was $$D = \frac{w}{20} = 1.4$$

and when the friction coefficient with the above-mentioned value $$S\frac{w}{20}$$

is substituted, it gives a molecular weight of 6000.

(7) Neocarzinostatin is readily soluble in water; fairly soluble in hydrated methanol, and hydrated ethanol; slightly soluble in methanol, ethanol, butanol; and substantially insoluble in acetone, ethyl acetate, butyl acetate, ether, chloroform and petroleum ether.

(8) Neocarzinostatin tends to be relatively more stable at acid pH than at neutral pH, and is unstable in alkali.

(9) Neocarzinostatin is biuret positive and orcinol negative. When it is subjected to hydrolysis in a closed tube with concentrated nitric acid at 100° C. for 18 hours, amino acids, e.g. aspartic acid, glycine, alanine, serine, glutamic acid, proline, leucine, phenyl alanine, threonine, arginine, lysine, valine, cysteine, isoleucine, etc., are detected therein.

(10) Neocarzinostatin is capable of being precipitated from an aqueous solution by precipitants, e.g. ammonium sulfate phosphotungstic acid, zinc chloride and the like, but it is not precipitated by ammonium reineckate, picric acid, flavic acid, methyl orange, etc.

Next, the most characteristic biological activity of this substance shall be described:

(1) *Antibiotic action.*—The antibiotic activity of this substance is as indicated in the following table.

| Bacteria tested: | Minimum inhibitory concentration (mcg./ml.) |
|---|---|
| *Staphylococcus aureus* 209P | 30 |
| *Staphylococcus aureus* Kishima | 60 |
| *Staphylococcus aureus* Smith | 15 |
| *Staphylococcus aureus* 537 | 30 |
| *Sarcina lutea* PCI 1001 | 4 |
| *Sarcina lutea* | 4 |
| *Bacillus subtilis* 219 | 60 |
| *Escherichia coli* NHIJ | >1000 |
| *Shigella flexneri* 2a | >1000 |
| *Shigella sonnei* | 1000 |
| *Salmonella typhosa* | >1000 |
| *Vibrio comma* | >1000 |
| *Proteus rettgeri* | >1000 |
| *Xanthomonas oryze* | 1000 |
| *Mycobacterium tuberculosis* 607 | >1000 |
| *Candida albicans* | >1000 |

(2) *Antitumor effects.*—The characteristic of neocarzinostatin is that, compared with the growth inhibiting concentrations for microorganisms, it displays degenerative effects on various tumor cells at an extremely low concentration; that is, this product which blocks the growth of *Sarcina lutea* at 2.0 mcg./ml. clearly induces a degenerative effect on cells cultured in a test tube at the low concentration of 0.2–0.1 mcg./ml.

Furthermore, its antitumor action can be most significantly demonstrated in tumor tests on mice.

For example, in the case of mice inoculated in the abdomen with 4,000,000 Sarcoma 180 ascites tumor cells, administration of the agent into the abdomen daily, continuously for 6 days, starting 24–48 hours after tumor inoculation, in a wide range of doses, 3.2–0.1 mg./kg. of body weight, distinctly suppressed the accumulation of abdominal dropsy without causing toxicity to the carrier mice and sharply lengthened their lives. At doses of 3.2, 1.6, and 0.8 mg./kg., all of the treated mice fully recovered and lived; proving that the chemotherapeutic coefficient is very high. Since the effective dose range was 0.1–3.2 mg./kg., and the acute toxicity of this product for the mouse was 30 mg./kg., the therapeutic ratio for the minimum effective dose which prolongs the life of the cancer-carrying mouse was 300.

Likewise, this product was able to prolong the life of the mouse remarkably within the range of 3.2–0.2 mg./kg. by the method described earlier when used for tumors, such as leukemia SN–36 of the mouse, for which no effective natural product anticancer substances have been discovered.

The effect on the above two types of cancer was noted with the culture filtrate, recognized through the entire process of refining, and then it was established that conducting the refining process with continuous testing for the inhibitory effect on *Sarcina lutea* had the same significance as conducting the extraction on the basis of the active substance for tumors.

Further, by using a coarse product obtained by ammonium sulfate sedimentation, activity was discovered also for Ehrlich's ascites, mouse ascitic liver cancer MH 134, mouse leukemia L–1210, Ehrlich's subcutaneous solid cancer, Carcoma 180 subcutaneous solid cancer, and Bashford's subcutaneous solid cancer. In order to make the treatment effective for the subcutaneous solid cancer, an intravenous injection was found preferable.

The above-stated properties of neocarzinostatin verify that this product is a new substance discovered by the present inventors, and is a useful substance.

Actual examples for the production and purification of neocarzinostatin are described below. It will be seen that by a combination of various single extracting methods to be explained, neocarzinostatin with a high degree of purity may be obtained. As said before, since various properties of the active substance have been described, it should be evident to technical experts that isolation can be obtained by different or modified means, even though not actually described herein, and such different or modified means are considered within the scope of the claims of this invention.

Example 1

An aqueous culture medium was prepared containing the following ingredients:

|  | Percent |
|---|---|
| Starch | 2.0 |
| Exoleated soybean powder | 2.0 |
| Dry yeast | 0.5 |
| Sodium chloride | 0.25 |
| Manganese chloride | 0.0005 |
| Copper sulfate | 0.0005 |
| Zinc sulfate | 0.0005 |
| Calcium carbonate | 0.2 |

After sterilizing, and adjusting to pH 7.0, 100 ml. of the medium was placed in each of several test tubes, 500 cc. capacity, and sterilized.. Streptomyces carzinostaticus var. neocarzinostaticus strain F–41 was inoculated therein, and fermented with agitation for 24 hours at 27° C. and then used as the stock culture.

Next, an aqueous production culture medium was prepared containing:

|  | Percent |
|---|---|
| Glucose | 3.0 |
| Peptone | 0.5 |
| Meat extract | 0.5 |
| Sodium chloride | 0.5 |
| Calcium carbonate | 0.2 |

After sterilization, the medium was adjusted to pH 7.0. One hundred ml. of the production medium was placed in each of 70 test tubes, 500 cc. capacity and sterilized. Five percent by volume of the above-mentioned stock culture was added to the production culture medium in each test tube and fermented with agitation at 27° C. The pH became 6.6 after an incubation period of 36 hours, and 6.8–7.2 after 48 hours. After that, the pH showed no further change. When the amount of neocarzinostatin in the liquid was measured by its action on *Sarcina lutea*, it had reached 40 mcg./ml. by 24 hours' culture, 73 mcg./ml. by 36 hours, 100 mcg./ml. by 48 hours, and 130 mcg./ml. by 64 hours. Fermentation was suspended after 64 hours, and solids containing the mycelium were separated by filtration. Filter paper was used and 5.0 liters of culture liquid containing 130 mcg./ml. of the active ingredient were obtained.

Example 2

The culture liquid obtained in Example 1 above was adjusted to pH 3.0 with a saturated oxalic acid solution and the precipitate formed therein collected by filtration. The filtrate was added to 50 gm. each of kaolin and Celite 545 powder (diatomaceous earth), and stirred for 15 hours at 4° C.; and after chromoprotein was allowed to adsorb as much as possible, it was filtered. The resulting filtrate was divided and placed in cellophane bags; dry air was blown on them at 27° C. for 24 hours condensing them to about 600 ml. This concentrated solution at 4° C. was desalted by cellophane dialysis for 24 hours in distilled water.

The yield of desalted concentrated solution from the culture liquid was approximately 80% (867 mcg./ml., 600 ml.).

Example 3

The concentrated solution obtained in Example 2 was thoroughly stirred at 4° C., solid ammonium sulfate was added, amounting to 25% (150 gm.) by volume; the resulting brown precipitate was collected by centrifugation and thoroughly washed. Ammonium sulfate (150 gm.) was again added, and after leaving it for 15 hours at 4° C., the greyish white precipitate formed was isolated by a refrigeration-centrifugation method. The precipitate was washed several times with a cool aqueous ammonium sulfate solution, dissolved in 20 ml. of distilled water and dialyzed overnight at 4° C. against distilled water. After desalting, the liquid was passed through a column of Sephadex G–25. The passage solution was lyophilized and 660 mg. of a light yellow coarse powder, neocarzinostatin, was produced. When this powder was tested by measuring its antibiotic potency against *Sarcina lutea*, it assayed 330 mcg./mg. The yield from the culture liquor of Example 1 was 56%.

Example 4

Five hundred mg. (330 mcg./ml.) of the coarse neocarzinostatin powder produced in Example 3 were dissolved in 4.0 ml., pH 6.0, 0.001 M phosphoric acid buffer solution, centrifuged at 10,000 r.p.m. for 20 minutes to remove insolubles and subjected to chromotography, i.e., 32 ml. of DEAE-Sephadex A–25 were packed in a column, 2 cm. in diameter and thoroughly pretreated with 0.001 M phosphoric acid buffer solution, pH 6.0; and then 4.0 ml. of neocarzinostatin solution, pH 7.0, was passed through the column. The adsorbed neocarzinostatin was then effused by saline solution fractions of increased sodium chloride concentration. When the above-mentioned chromatography was applied, the effective principle was effused, appearing for the first time, as a peak, about the time the change-over was made to a sodium chloride concentration of 0.15 M. The fractions containing the active material were combined, dialyzed for 24 hours at 4° C. against distilled water, and then lyophilized to give 138 mg. of a white powder. Forty-four percent of the coarse powder was recovered with a product purity of 535 mcg./mg. By repeating the chromatographic process, 1000 mcg./mg. purity of the product, neocarzinostatin, was obtained.

Example 5

*Streptomyces carzinostaticus* var. *neocarzinostaticus*, A.T.C.C. No. 15945 was fermented according to the procedure described in Example 1. After 64 hours' fermentation, the culture liquid was found to have substantial activity against *Sarcina lutea* and the fermentation was suspended. The mycelium was separated and liquid containing the active ingredient, neocarzinostatin, was obtained. Neocarzinostatin, having a purity of 1,000 mcg./mg., was then recovered from the liquid by the methods described in Examples 2, 3 and 4.

Example 6

*Streptomyces carzinostaticus* var. *neocarzinostaticus*, A.T.C.C. No. 15944 was fermented according to the procedure described in Example 1. After 64 hours' fermentation, the culture liquid was found to have substantial activity against *Sarcina lutea* and the fermentation was suspended. The mycelium was separated and liquid containing the active ingredient, neocarzinostatin, was obtained. Neocarzinostatin, having a purity of 1,000 mcg./mg., was then recovered from the liquid by the methods described in Examples 2, 3 and 4.

What is claimed is:

1. The process of producing an antibiotic identified as neocarzinostatin which comprises cultivating a strain of *Streptomyces carzinostaticus* var. *neocarzinostaticus* under submerged aerobic conditions in an aqueous carbohydrate solution containing a nitrogenous nutrient until substantial antibacterial activity against *Sarcina lutea* is produced in said solution.

2. The process of claim 1 in which the organism is *Streptomyces carzinostaticus* var. *neocarzinostaticus*, A.T.C.C. No. 15945.

3. The process of claim 1 in which the organism is *Streptomyces carzinostaticus* var. *neocarzinostaticus*, A.T.C.C. No. 15944.

4. The process of producing an antibiotic identified as neocarzinostatin which comprises cultivating a strain of *Streptomyces carzinostaticus* var. *neocarzinostaticus* under submerged aerobic conditions in an aqueous carbohydrate solution containing a nitrogenous nutrient until substantial antibacterial activity against *Sarcina lutea* is produced in said solution, and then recovering said neocarzinostatin from said solution.

5. The process of claim 4 in which the organism is *Streptomyces carzinostaticus* var. *neocarzinostaticus*, A.T.C.C. No. 15945.

6. The process of claim 4 in which the organism is *Streptomyces carzinostaticus* var. *neocarzinostaticus*, A.T.C.C. No. 15944.

7. The process according to claim 4 wherein the antibiotic neocarzinostatin is recovered from an aqueous solution thereof by precipitation with ammonium sulfate.

8. The process according to claim 4 wherein the antibiotic neocarzinostatin is recovered from an aqueous solution thereof by adsorption on DEAE-Sephadex and subsequent elution.

9. The process according to claim 8 wherein saline solution is used for elution of the adsorbed antibiotic.

10. A new antibiotic designated neocarzinostatin which is prepared by the process of claim 1.

No references cited.

A. LOUIS MONACELL, *Primary Examiner.*

L. M. SHAPIRO, *Assistant Examiner.*